US009126316B2

(12) United States Patent
Oomori

(10) Patent No.: US 9,126,316 B2
(45) Date of Patent: Sep. 8, 2015

(54) ELECTRIC TOOL

(75) Inventor: Katsuhiro Oomori, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 241 days.

(21) Appl. No.: 13/494,615

(22) Filed: Jun. 12, 2012

(65) Prior Publication Data

US 2012/0319508 A1 Dec. 20, 2012

(30) Foreign Application Priority Data

Jun. 15, 2011 (JP) ................. 2011-133707

(51) Int. Cl.
*H02K 7/14* (2006.01)
*B25B 21/02* (2006.01)
*B25F 5/02* (2006.01)

(52) U.S. Cl.
CPC . *B25B 21/02* (2013.01); *B25F 5/02* (2013.01); *H02K 7/145* (2013.01)

(58) Field of Classification Search
CPC ........ H02K 7/145; B25B 21/02; B25F 5/001; B25F 5/006; B25F 5/02
USPC ...................................................... 310/50, 71
See application file for complete search history.

(56) References Cited

U.S. PATENT DOCUMENTS

| 2,987,636 | A | * | 6/1961 | Jepson | 310/50 |
|---|---|---|---|---|---|
| 4,081,704 | A | * | 3/1978 | Vassos et al. | 310/50 |
| 5,760,505 | A | * | 6/1998 | Farou et al. | 310/71 |
| 5,996,209 | A | * | 12/1999 | Molnar et al. | 29/596 |
| 6,488,475 | B2 | * | 12/2002 | Murata et al. | 417/32 |
| 7,093,344 | B2 | * | 8/2006 | Miya et al. | 29/596 |
| 7,159,296 | B2 | * | 1/2007 | Miya et al. | 29/598 |
| 7,635,933 | B2 | * | 12/2009 | Makino et al. | 310/71 |
| 2001/0036409 | A1 | | 11/2001 | Murata et al. | |
| 2001/0048256 | A1 | * | 12/2001 | Miyazaki et al. | 310/81 |
| 2003/0011271 | A1 | * | 1/2003 | Takano et al. | 310/254 |
| 2004/0051410 | A1 | | 3/2004 | Miya et al. | |
| 2006/0238044 | A1 | * | 10/2006 | Miya et al. | 310/71 |
| 2008/0106159 | A1 | * | 5/2008 | Yoshida et al. | 310/50 |
| 2008/0122304 | A1 | * | 5/2008 | Makino et al. | 310/71 |
| 2008/0265695 | A1 | * | 10/2008 | Yoshida et al. | 310/50 |
| 2010/0244592 | A1 | * | 9/2010 | Oomori et al. | 310/50 |
| 2010/0320880 | A1 | * | 12/2010 | Kamogi | 310/68 B |
| 2011/0068642 | A1 | * | 3/2011 | Takeyama et al. | 310/50 |
| 2011/0180286 | A1 | | 7/2011 | Oomori et al. | |
| 2011/0227430 | A1 | | 9/2011 | Omori et al. | |

FOREIGN PATENT DOCUMENTS

| CN | 101295897 A | 10/2008 |
|---|---|---|
| JP | 2004-40843 A | 2/2004 |

(Continued)

OTHER PUBLICATIONS

Japanese Office Action for the related Japanese Patent Application No. 2011-133707 dated Jan. 21, 2015.

(Continued)

*Primary Examiner* — Alex W Mok
(74) *Attorney, Agent, or Firm* — Kenealy Vaidya LLP

(57) ABSTRACT

An electric tool including: a motor having a stator coil; and a circuit board, wherein the stator coil includes a coil main body and an extending part extending from the coil main body and electrically connected to the circuit board, and wherein the extending part is slacked.

6 Claims, 4 Drawing Sheets

(56) References Cited

FOREIGN PATENT DOCUMENTS

| | | |
|---|---|---|
| JP | 2008-272869 A | 11/2008 |
| JP | 2009-285787 A | 12/2009 |
| JP | 2010-99823 A | 5/2010 |
| WO | 2008/156185 A1 | 12/2008 |
| WO | WO 2009145205 A1 * 12/2009 | ............... B25F 5/00 |
| WO | WO 2009145206 A2 * 12/2009 | ............... B25F 5/00 |

OTHER PUBLICATIONS

Chinese Office Action for the related Chinese Patent Application No. 201210202591.1 dated Sep. 29, 2014.

* cited by examiner

ELECTRIC TOOL

CROSS-REFERENCE TO RELATED APPLICATIONS

This application claims priority from Japanese Patent Application No. 2011-133707 filed on Jun. 15, 2011, the entire contents of which are incorporated herein by reference.

TECHNICAL FIELD

Aspects of the present invention relate to an electric tool powered by a motor having a stator coil.

BACKGROUND

Recently, a brushless DC motor has been used for an electric tool in which a tip tool such as a drill or driver is rotationally driven by a motor to perform a desired operation. The brushless DC motor is a DC (Direct Current) motor which has no brush (brush for rectification). The brushless DC motor includes a coil on a stator side and a magnet on a rotor side. The brushless DC motor is so configured that a power driven by an inverter is sequentially energized to a predetermined coil to rotate the rotor. In the brushless DC motor, a switching element for turning on/off the energization of the coil wound around a stator is placed on a circuit board near the motor. The switching element is located on an approximately circular circuit board attached to a rear side (a side opposite to the tip tool) of the motor (for example, see, JP-A-2010-99823).

An electric tool using the brushless DC motor typically includes a star-connected three-phase coil and a total of six switching elements are used in such a way that one switching element is respectively provided on the positive side and the negative side of each phase. Since a relatively large current flows in the brushless DC motor, a heating value of the switching element increases. In order to effectively cool the switching element, an air inlet is provided to a portion of a housing near the inverter circuit board. The circuit board is arranged perpendicular to a rotating shaft of the motor and the switching element is placed on the circuit board. A fan is mounted on the rotating shaft of the brushless DC motor. Outside air is suctioned through the air inlet by the fan to cool the switching element or the brushless DC motor.

In a related-art electric tool, an inverter circuit board mounted with a switching element is disposed at rear to the motor. The circuit board is mounted with an inverter circuit or hall IC, etc., and is held on a protrusion of an insulator. Such structure will be described by referring to FIGS. 5 and 6.

FIG. 5 is a side view illustrating an inverter circuit board and a stator of a motor in a related-art electric tool. FIG. 6 is a rear view of FIG. 5. In these drawings, a rotor and a rotating shaft of the parts constituting the motor have been omitted. In the brushless type motor, an end of a stator coil 3c passes inside an insulator 15, passes thorough an opening formed in an inverter circuit board 4 and is fixed at an opposite side of the inverter circuit 4 by a solder 9. A total of six stator coils 3c are soldered to the inverter circuit board 4. In addition, six switching elements 5 are mounted on the inverter circuit board 4.

SUMMARY

When the type of the electric tool is, for example, an impact driver, a striking reaction force upon every striking operation is transmitted to the housing via a hammer case, and thus, a vibration is transmitted to the motor which includes a stator core 3b fixed to the housing. At this time, since the stator core 3b is vibrated by a striking reaction force, the inverter circuit board 4 fixed to the stator core 3b via the insulator 15 is similarly vibrated. The inverter circuit board 4 is fixed to the insulator 15 by a plurality of screws 18, for example. However, in a case of using a double-sided board, the inverter circuit board 4 contacts with the insulator 15 only around the screw. Accordingly, the inverter circuit board 4 is warped by the vibration with a fixed portion of the screw as a pivot point. Such a warping of the inverter circuit board 4 is not limited to the impact driver but equally occurs in electric tools subjected to a reaction force from a tip tool. Further, there is a risk that such a warping phenomenon occurs as long as the vibration is transmitted, even in a case of one-sided board.

In the related-art electric tool, when the output of the motor 3 is small or a striking torque by the impact tool is small, the warping of the inverter circuit board 4 is also small and thus can be ignorable. However, when the striking torque increases, the stator coil 3c is largely warped around a contact area (solder joint) between the stator coil 3c and an opening formed to the inverter circuit board 4. Accordingly, there is a risk that the stator coil 3c is damaged (for example, disconnected).

The present invention has been made to solve the above-described problems, and an object of the present invention is to provide an electric tool capable of reducing a risk of disconnection of the stator coil from the circuit board.

According to an aspect of the invention, there is provided an electric tool including: a motor having a stator coil; and a circuit board, wherein the stator coil includes a coil main body and an extending part extending from the coil main body and electrically connected to the circuit board, and wherein the extending part is slacked.

Any combinations of the above-described components, or application of the above-described configuration to a method, a system, etc., are also effective as an aspect of the present invention.

According to the present invention, since the extending part of the stator coil is slacked, it is possible to reduce a risk of disconnection of the stator coil from the circuit board.

DETAILED DESCRIPTION

Figure 1:
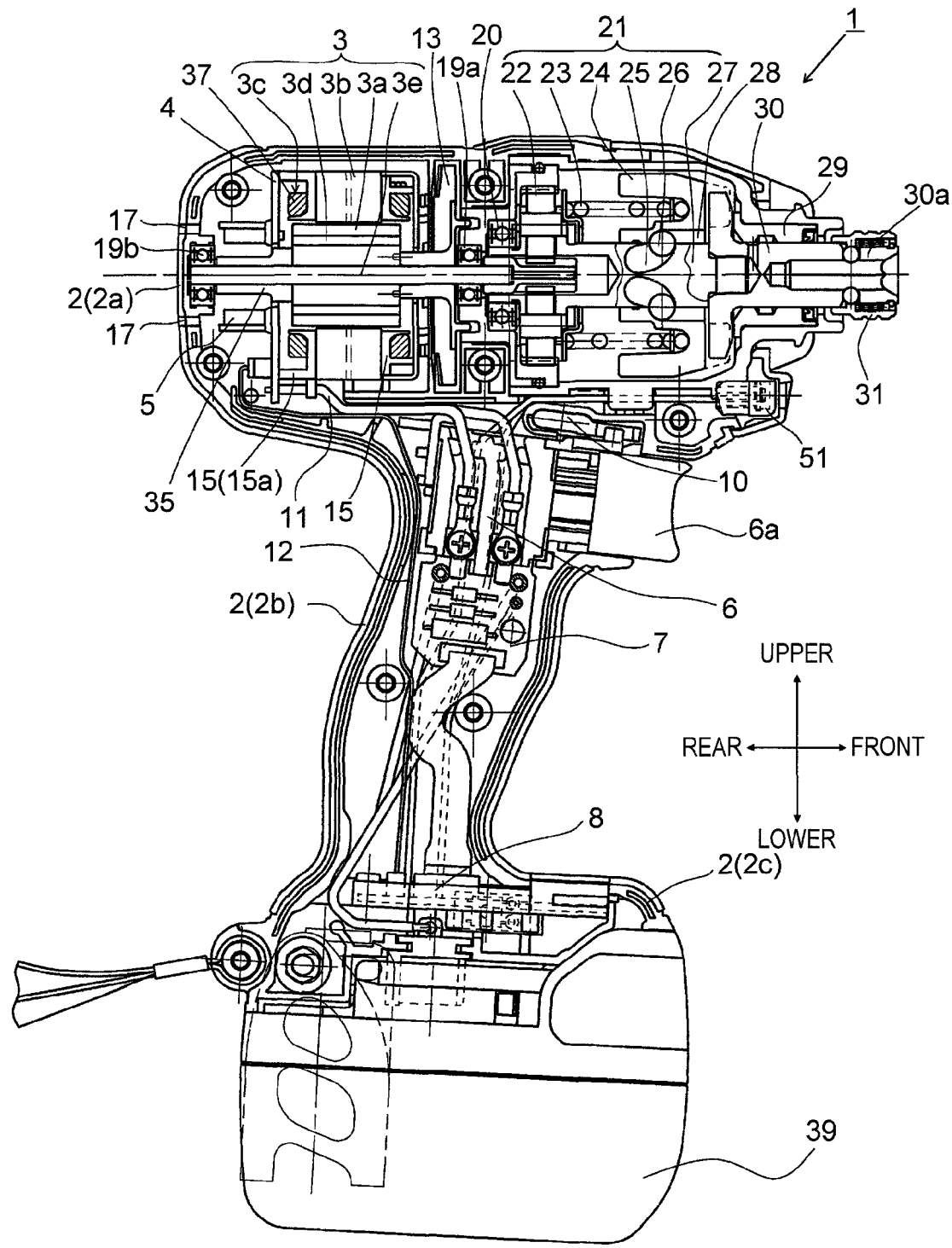
FIG. 1 is a side cross-sectional view illustrating an inner configuration of an electric tool according to an exemplary embodiment of the present invention.

Hereinafter, an exemplary embodiment of the present invention will be described by referring to the accompanying drawings. The same or similar reference numerals are applied to the same or similar parts, elements and processes throughout the drawings, and duplicated description thereof will be omitted. Further, the exemplary embodiment is not intended to limit the present invention. It should be noted that all the features and their combinations described in the exemplary embodiment are not necessarily considered as an essential part of the present invention.

FIG. 1 is a side cross-sectional view illustrating an inner configuration of an electric tool 1 according to an exemplary embodiment of the present invention. For example, the electric tool 1 is an impact driver. Although a related-art configuration for rotationally driving a tip tool may be used in the impact driver, hereinafter, an example thereof will be described.

The electric tool 1 is powered by a rechargeable battery 39 and uses a motor 3 as a driving source to drive a rotary striking mechanism 21. The electric tool 1 applies a rotating force and a striking force to an anvil 30 which is an output shaft. The electric tool 1 intermittently transmits a rotational striking force to a tip tool (not-illustrated) such as a driver bit to fasten a screw or a bolt. The tip tool is held on an mounting hole 30a which is covered with a sleeve 31.

The brushless DC type motor 3 (for example, 4-pole, 6-coil type or 2-pole, 3-coil type) is accommodated in a cylindrical trunk part 2a of a housing 2 which is substantially T-shaped, as seen from a side view. A rotating shaft 3e of the motor 3 is rotatably maintained by a bearing 19a (bearing member) and a bearing 19b (bearing member). The bearing 19a is provided near the center of the trunk part 2a of the housing 2 and the bearing 19b is provided on a rear end side thereof. A rotor fan 13 is provided in front of the motor 3. The rotor fan 13 is mounted coaxially with the rotating shaft 3e and rotates in synchronization with the motor 3. An inverter circuit board 4 for driving the motor 3 is arranged in the rear of the motor 3. Air flow generated by the rotor fan 13 is introduced into the trunk part 2a through an air inlet 17 formed on a rear side of the trunk part 2a of the housing 2 and an air inlet (not-illustrated) formed on a portion of the housing surrounding the inverter circuit board 4. And then, the air flow mainly flows to pass through between a rotor 3a and a stator core 3b. The air flow is sucked form the rear side of the rotor fan 13 and flows in the radial direction of the rotor fan 13. And, the air flow is discharged to the outside of the housing 2 through an air outlet (not-illustrated) formed on a portion of the housing around the rotor fan 13.

The inverter circuit board 4 is a ring-shaped multilayer board having a diameter substantially equal to an outer shape of the motor 3. A plurality of switching elements 5 such as FETs (Field Effect Transistor), a position detection element such as hall IC, or other electronic elements are mounted on the inverter circuit board 4. A plastic spacer 35 is provided between the rotor 3a and the bearing 19b. The spacer 35 is formed in an approximately cylindrical shape and arranged to keep a gap between the bearing 19b and the rotor 3a to be constant.

A handle part 2b extends nearly at a right angle from and integrally with the trunk part 2a of the housing 2. A trigger switch 6 is provided on an upper portion of the handle part 2b. A switch board 7 is provided below the trigger switch 6. A control circuit board 8 is accommodated in a lower portion of the handle part 2b. The control circuit board 8 has a function to control the speed of the motor 3 by an operation of pulling a trigger 6a. The control circuit board 8 is electrically connected to the battery 39 and the trigger switch 6. The control circuit board 8 is connected to the inverter circuit board 4 via a signal line 12. A battery mounting part 2c is provided below the handle part 2b. The battery 39 constituted by a nickel-cadmium battery, a lithium-ion battery etc. is removably mounted to the battery mounting part 2c.

The rotary striking mechanism 21 includes a planetary gear reduction mechanism 22, a spindle 27 and a hammer 24. A rear end of the rotary striking mechanism is held by a bearing 20 and a front end thereof is held by a metal bearing 29. As the trigger switch 6 is pulled and thus the motor 3 is started, the motor 3 starts to rotate in a direction set by a forward/reverse switching lever 10. The rotating force of the motor is reduced by the planetary gear reduction mechanism 22 and transmitted to the spindle 27. Accordingly, the spindle 27 is rotationally driven in a predetermined speed. Here, the spindle 27 and the hammer 24 are connected to each other by a cam mechanism. The cam mechanism includes a V-shaped spindle cam groove 25 formed on an outer peripheral surface of the spindle 27, a hammer cam groove 28 formed on an inner peripheral surface of the hammer 24 and a ball 26 engaged with these cam grooves 25, 28.

The hammer 24 is always urged forward by a spring 23. The hammer 24 is located at a position spaced away from an end surface of the anvil 30 by an engagement of the ball 26 and the cam grooves 25, 28 in a stationary state. Convex portions (not-illustrated) are symmetrically formed to two places of the rotation plane of the hammer 24 and the anvil 30 which are opposed to each other.

As the spindle 27 is rotationally driven, the rotation of the spindle is transmitted to the hammer 24 via the cam mechanism. At this time, before the hammer 24 makes a half turn, the convex portion of the hammer 24 is engaged with the convex portion of the anvil 30, thereby rotating the anvil 30. However, in a case where the relative rotation between the spindle 27 and the hammer 24 occurs due to an engaging reaction force, the hammer 24 starts to retreat toward the motor 3 while compressing the spring 23 along the spindle cam groove 25 of the cam mechanism.

And, when the convex portion of the hammer 24 goes beyond the convex portion of the anvil 30 by the retreating movement of the hammer 24 and thus engagement between these convex portions is released, the hammer 24 is rapidly accelerated in a rotation direction and also in a forward direction by the elastic energy accumulated in the spring 23 and the action of the cam mechanism, in addition to the rotation force of the spindle 27. Further, the hammer 24 is displaced in a forward direction by an urging force of the spring 23 and the convex portion of the hammer 24 is again engaged with the convex portion of the anvil 30. Thereby, the hammer starts to rotate integrally with the anvil. At this time, since a powerful rotational striking force is applied to the anvil 30, the rotational striking force is transmitted to a screw via a tip tool (not-illustrated) mounted on the mounting hole 30a of the anvil 30. Thereafter, the same operation is repeatedly performed and thus the rotational striking force is intermittently and repeatedly transmitted from the tip tool to the screw. Thereby, the screw can be screwed into a member to be fastened (not-illustrated) such as wood, for example. A light 51 irradiates a tip side of the tip tool and the member to be fastened.

Figure 2:
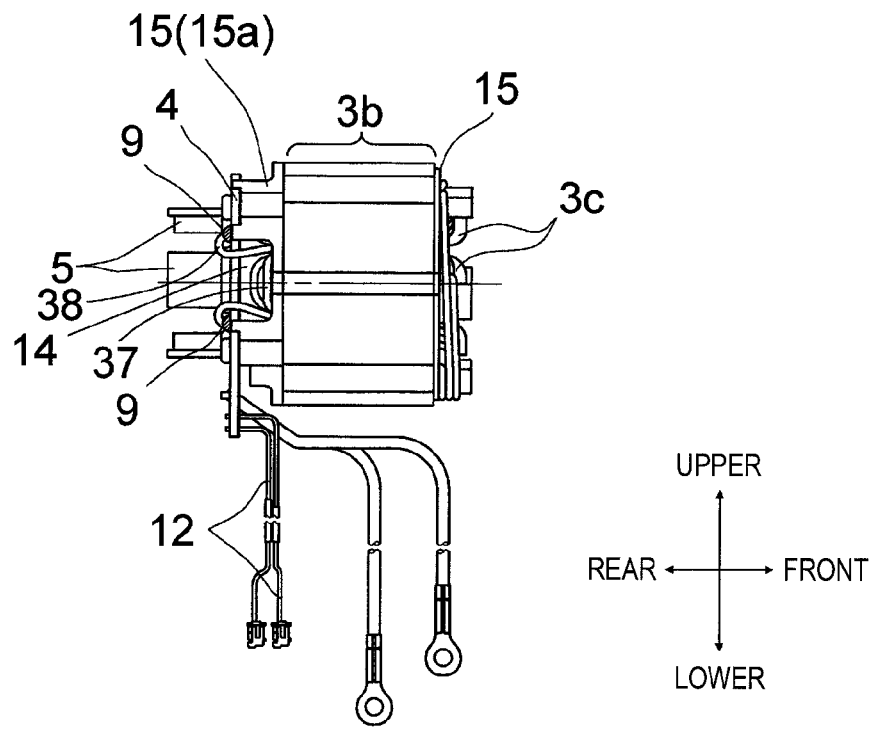
FIG. 2 is a side view illustrating a connection structure of a stator coil and an inverter circuit board of FIG. 1.
Figure 3:
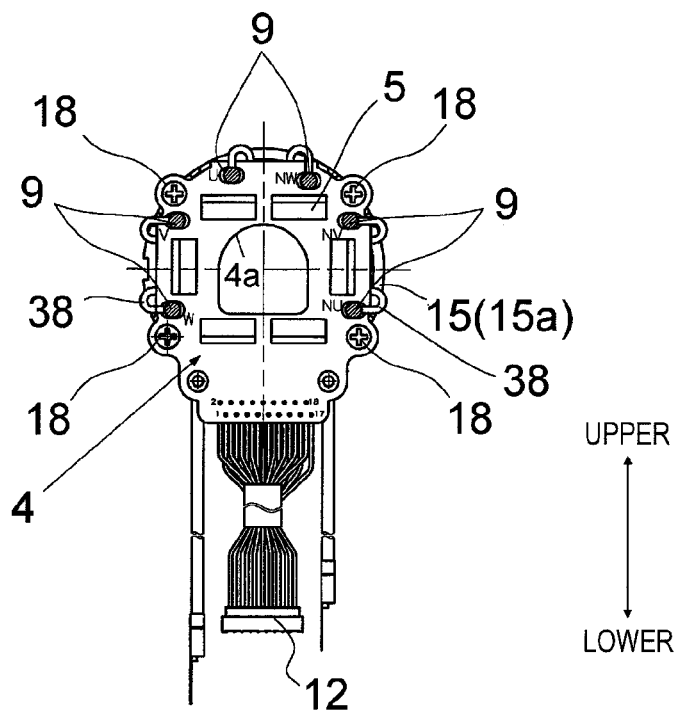
FIG. 3 is a rear view of the connection structure as seen from the rear.

FIG. 2 is a side view illustrating a connection structure of a stator coil 3c and the inverter circuit board 4 of FIG. 1. FIG. 3 is a rear view of the connection structure as seen from the rear side. The connection structure illustrated in the drawing is one of the characteristics of the present exemplary embodiment different from related art.

The stator coil 3c includes a coil main body 37 and an extending part 38. The coil main body 37 generates a magnetic field which is applied to a rotor magnet 3d illustrated in FIG. 1. The extending part 38 extends from the coil main body 37 and electrically connected to the inverter circuit board 4.

The inverter circuit board 4 is perpendicular to the rotating shaft 3e of the motor 3 illustrated in FIG. 1. The inverter circuit board 4 has a first surface facing the coil main body 37 and a second surface not facing the coil main body 37. The inverter circuit board 4 is a multilayer board composed of a glass epoxy board (which is obtained by curing a glass fiber by epoxy resin), for example, and is formed in an approximately ring shape having a diameter substantially equal to an outer diameter of the stator core 3b.

An insulator 15 is a member for insulating the stator core 3b from the stator coil 3c and the inverter circuit board 4. The insulator 15 has a cylindrical part 15a extending in a cylindrical shape from the stator core 3b toward the inverter circuit board 4. The cylindrical part 15a has an axial direction substantially parallel to a direction of the rotating shaft 3e of the motor 3. The inverter circuit board 4 is fixed to an end of the cylindrical part 15a. Specifically, four mounting holes are formed around the inverter circuit board 4 and the inverter circuit board 4 is screwed into the insulator 15 by screws 18 passing through the mounting holes. Accordingly, the inverter circuit board 4 is in a state of being fixed to the stator. Holes 4a through which the rotating shaft 3e of the motor 3 and a spacer 35 pass are formed at the center of the inverter circuit board 4. Six switching elements 5 are erectly mounted on the inverter circuit board 4 to surround the holes 4a. That is, the switching elements 5 are mounted on the inverter circuit board 4 such that a surface of the switching element 5 having the largest dimension is substantially perpendicular to the inverter circuit board 4.

The cylindrical part 15a of the insulator 15 includes a cut-out 14 or opening at a side surface thereof. The cut-out 14 is located at a position opposing an air introducing slot (not-illustrated) (air inlet) provided to the trunk part 2a of the housing 2. The extending part 38 of the stator coil 3c passes through the cut-out 14 and extends from the inside to the outside of the cylindrical part 15a. And then, the extending part extends from a first surface (the surface facing the coil main body 37) side of the inverter circuit board 4 to a second surface side of the inverter circuit board 4 via an outer side of the inverter circuit board 4. And then, the extending part is bent (folded back) at the second surface side and is inserted into a penetrating hole of the inverter circuit board 4. In this way, the extending part 38 is electrically connected to the inverter circuit board 4 by soldering using the solder 9, for example. As such, the extending part 38 is not connected to the inverter circuit board 4 in the shortest distance from the coil main body 37 and is slacked. There are various methods for slacking the extending part 38. In an example of FIGS. 2 and 3, the extending part 38 is slacked so that the extending part 38 at the second surface side of the inverter circuit board 4 is spaced apart from the second surface of the inverter circuit board 4.

Figure 4:
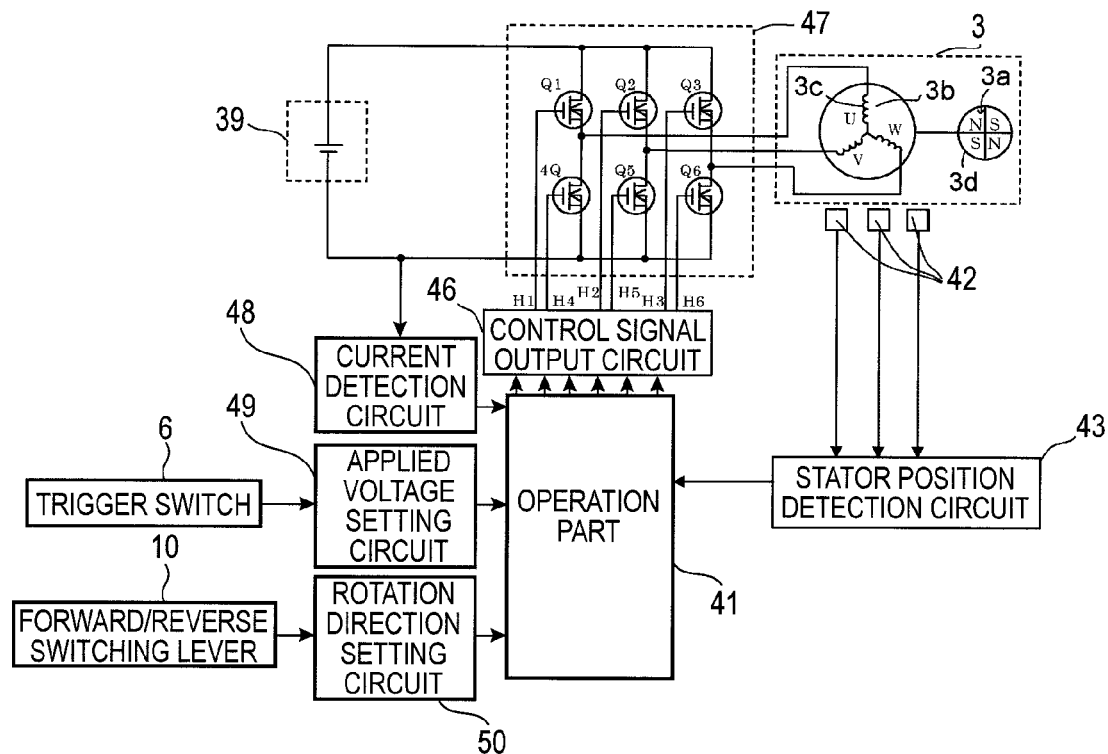
FIG. 4 is a block diagram illustrating a circuit configuration of a drive control system of a motor illustrated in FIG. 1.
Figure 5:
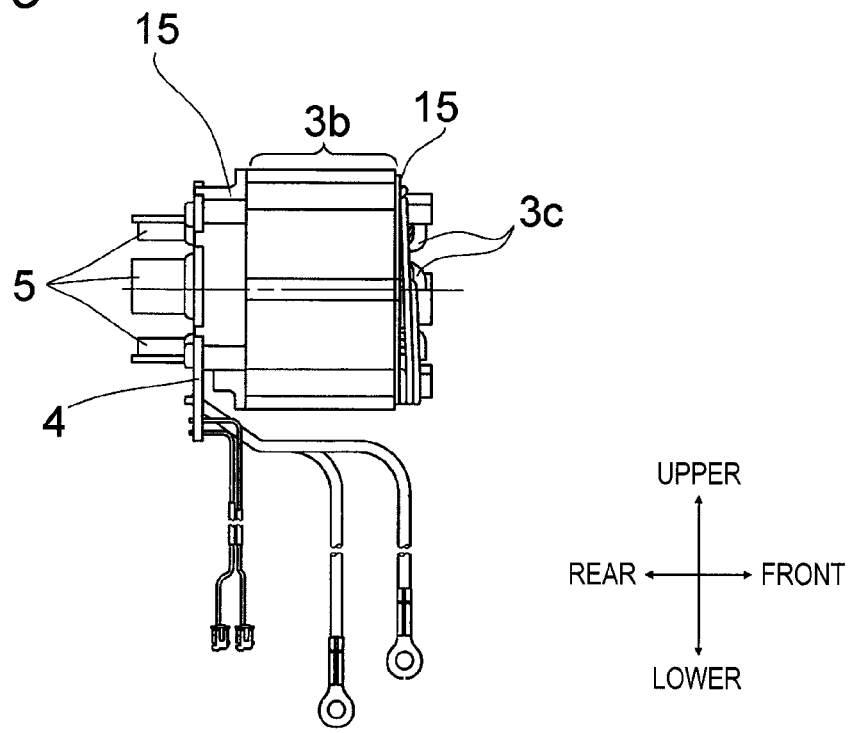
FIG. 5 is a side view illustrating an inverter circuit board and a stator of a motor in related art.
Figure 6:
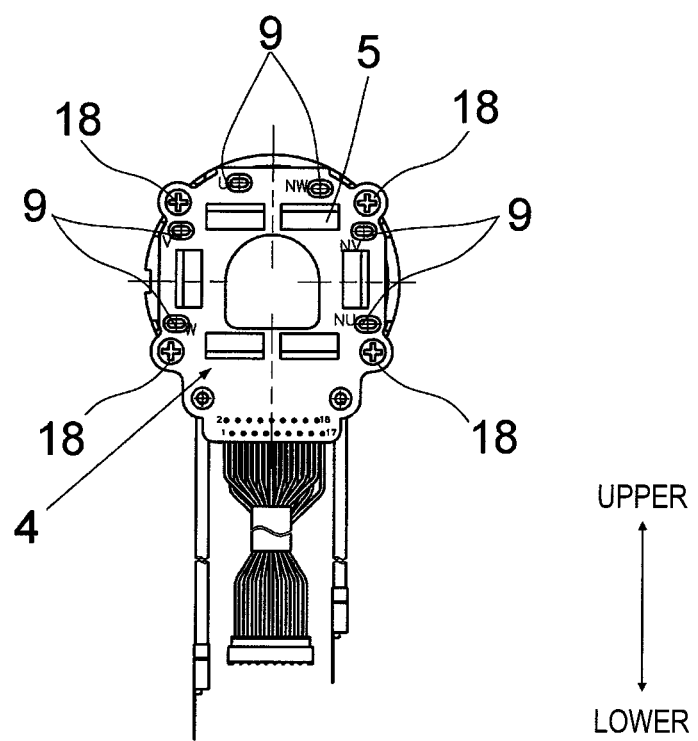
FIG. 6 is a rear view of FIG. 5.

A known configuration and operation can be used as the configuration and operation of a drive control system of the motor but an example thereof will be described hereinafter by referring to FIG. 4. FIG. 4 is a block diagram illustrating a configuration of a drive control system of the motor. In the present exemplary embodiment, the motor 3 is composed of three-phase brushless DC motor. The brushless DC motor is a so-called inner rotor type and includes the rotor 3a, the stator and three position detection elements 42. The rotor 3a includes the rotor magnet 3d which has a plurality of sets (two sets in the present exemplary embodiment) of N-pole and S-pole. The stator includes the stator coil 3c and the stator core 3b which are composed of the star-connected three-phase stator windings U, V W. The position detection elements 42 are arranged at a predetermined interval (for example, an angle of 60°) in the circumferential direction to detect the rotation position of the rotor 3a. The current flowing direction and time to the stator windings U, V and W are controlled based on the rotation position detection signal from the position detection elements 42 and the motor 3 is rotated. The position detection elements 42 are provided at positions on the inverter circuit board 4 opposing the rotor 3a.

Electronic elements mounted on the inverter circuit board 4 include six switching elements Q1 to Q6 such as FETs (Field Effect Transistor) which are connected to form a three-phase bridge. Each gate of the six switching elements Q1 to Q6 connected to form a three-phase bridge is connected to a control signal output circuit 46 mounted on a control circuit board 8. And, each drain or each source thereof is connected to the star-connected stator windings U, V and W. Thereby, the six switching elements Q1 to Q6 perform a switching operation in accordance with a switching element driving signal (driving signals such as H4, H5, H6, etc.) inputted from the control signal output circuit 46. In this way, a direct current voltage of the battery 39 applied to an inverter circuit 47 is supplied to the stator windings U, V and W as a three-phase (U phase, V phase and W phase) voltages Vu, Vv and Vw.

Out of the switching element driving signals (three-phase signals) for driving each gate of the six switching elements Q1 to Q6, the switching element driving signals for three negative power supply side switching elements Q4, Q5 and Q6 are supplied as pulse width modulation signals (PWM signals) H4, H5 and H6. And, an operation part 41 mounted on the control circuit board 8 changes the pulse widths (duty ratios) of the PWM signals based on the detection signal of the trigger operation amount (stroke) of the trigger switch 6 to adjust a power supply amount to the motor 3, thereby controlling the start/stop and the rotation speed of the motor 3.

Herein, the PWM signals are supplied to either of the positive power supply side switching elements Q1, Q2 and Q3 of the inverter circuit 47 or the negative power supply side switching elements Q4, Q5 and Q6 thereof to switch the switching elements Q1, Q2 and Q3 or the switching elements Q4, Q5 and Q6 at a high speed. As a result, the electric power of the DC voltage of the battery 39 supplied to each of the stator windings U, V and W is controlled. In this exemplary embodiment, since the PWM signals are supplied to the negative power supply side switching elements Q4, Q5 and Q6, it is possible to adjust the electric power supplied to each of the stator windings U, V and W by controlling the pulse widths of the PWM signals. Further, the electric power supplied to each of the stator windings U, V and W are controlled, whereby the rotation speed of the motor 3 can be controlled.

The electric tool 1 is provided with a forward/reverse switching lever 10 for switching the rotation direction of the motor 3. A rotation direction setting circuit 50 switches the rotation direction of the motor every time when the change of the forward/reverse switching lever 10 is detected and transmits a control signal thereof to the operation part 41. Although not shown, the operation part 41 includes a central processing unit (CPU) for outputting the driving signals based on a processing program and data, a ROM for storing the processing program and the control data, a RAM for temporarily storing the data, and a timer, etc.

The operation part 41 generates the driving signals for alternately switching the predetermined switching elements Q1 to Q6 based on the output signals from the rotation direction setting circuit 50 and a rotor position detection circuit 43, and transmits the driving signals to the control signal output circuit 46. Thus, the current is alternately energized to the predetermined coil of the stator windings U, V, W and thus the rotor rotates in the rotational direction set. In this case, the driving signals to be applied to the negative power supply side switching elements Q4, Q5 and Q6 are outputted as the PWM modulation signals based on the output control signals of an applied voltage setting circuit 49. The value of the current supplied to the motor 3 is measured by a current detection circuit 48 and then the measured value is fed back to the operation part 41, whereby the driving power supplied to the motor is adjusted so as to be a set value. The PWM signals may be applied to the positive power supply side switching elements Q1 to Q3.

According to the present exemplary embodiment, the following effects can be obtained.

(1) Since the extending part 38 of the stator coil 3c is formed to wrap around from the outer side of the inverter circuit board 4 and is soldered to the inverter circuit board 4 in a state of being slacked, a stress applied to a soldering portion (connection portion) is reduced even when an external force such as a reaction force during a rotational striking is applied. That is, since the external force can be released by an amount corresponding to the slack amount of the extending part 38, it is possible to eliminate or reduce the risk of disconnection of the stator coil 3c from the inverter circuit board 4. Accordingly, it is possible to realize an electric tool capable of improving reliability while prolonging the life of the motor, furthermore, the life of the product.

(2) Since the wind flow passes the cut-out 14 at the side of the insulator 15 through an air introducing slot (not-illustrated) provided to the trunk part 2a of the housing 2 and blows against the stator coil 3c, high cooling efficiency is realized. That is, the stator coil 3c can be arranged near inlet of the cut-out 14 serving as a ventilator window and thus high-speed cooling wind blows against the stator coil. Accordingly, it is possible to effectively suppress the temperature rise of the stator coil 3c.

While description has been made in connection with particular exemplary embodiments of the present invention, it will be obvious to those skilled in the art that various changes and modification may be made therein without departing from the scope of the claims. Hereinafter, examples of modifications thereof will be described.

The present invention may have a configuration that the extending part 38 of the stator coil 3c passes through a penetrating hole formed to the inverter circuit board 4, extends from the first surface (a surface facing the coil main body 37) side of the inverter circuit board 4 toward the second surface (a surface not facing the coil main body 37) side of the inverter circuit board 4, and then is folded back. In this case, the penetrating hole is a through hole different from the through hole to which the extending part 38 is connected by soldering, and may be the opening 4a of FIG. 3 or a through hole separately provided. Alternatively, the extending part 38 of the stator coil 3c may extend from the first surface side of the inverter circuit board 4 to the second surface side of the inverter circuit board 4 via outer sides of the stator core 3b, the insulator 15 and the inverter circuit board 4, and then be folded back. Further, the extending part 38 of the stator coil 3c may inserted into and soldered to the through hole for direct connection from the first surface side of the inverter circuit board 4, as long as it has a slack portion.

The motor may be a brush motor having a commutator, as long as the motor has a stator coil.

The present invention may be applied to an electric tool other than a fastening tool such as an electric driver, as long as the electric tool is powered by a motor having a stator coil. For example, the present invention may be widely applied to other electric tools such a portable circular saw, a portable grinder, a potable hammer/hammer drill, etc.

What is claimed is:

1. An electric tool comprising:
   a motor having a stator coil;
   a circuit board arranged at a rear side of the motor and having an inner surface facing toward the motor and an outer surface facing away from the motor; and
   an insulator including a cylindrical part extending in a cylindrical shape from the stator core toward the circuit board,
   wherein the stator coil includes a coil main body and an extending part extending from the coil main body,
   wherein the extending part extending from the coil main body is slacked and is configured to wrap around a periphery of the circuit board and electrically connect to the outer surface of the circuit board,
   wherein the inner surface of the circuit board faces the coil main body,
   wherein the extending part extending from the coil main body extends from the inner surface side of the circuit board to the outer surface side of the circuit board and is bent at the outer surface side to be connected to the circuit board,
   wherein the circuit board is fixed to an end of the cylindrical part of the insulator,
   wherein the cylindrical part of the insulator includes a cut-out or an opening at a side surface thereof, and
   wherein the extending part extending from the coil main body passes through the cut-out or the opening of the insulator as to extend from the inside of the cylindrical part of the insulator toward the inner surface of the circuit board, and then extends from the inner surface side of the circuit board toward the outer surface side of the circuit board.

2. The electric tool according to claim 1, wherein the extending part is slacked so that at least a portion of the extending part at the second surface side of the circuit board is spaced apart from the second surface of the circuit board.

3. The electric tool according to claim 1, wherein an axial direction of the cylindrical part is substantially parallel to an axial direction of the motor.

4. The electric tool according to claim 1, further comprising a rotary striking mechanism which is configured to be powered by a motor and to apply torque on a tip tool by a rotational striking force thereof.

5. The electric tool according to claim 1, wherein the motor is a brushless DC motor.

6. The electric tool according to claim 1, further comprising a housing accommodating the motor and the circuit board, wherein the stator coil and the circuit board are fixed to each other inside the housing.

* * * * *